United States Patent
Thomas et al.

(10) Patent No.: US 10,187,492 B2
(45) Date of Patent: Jan. 22, 2019

(54) MAINTENANCE WINDOW SCHEDULING

(71) Applicant: Hewlett Packard Enterprise Development LP, Houston, TX (US)

(72) Inventors: Kishan Thomas, Sunnyvale, CA (US); Michele Yoshikawa, Sunnyvale, CA (US); Dongye Pan, Sunnyvale, CA (US); Jeffrey Russell Roecks, California, CA (US); Stephen Lee Kirkendall, Sunnyvale, CA (US)

(73) Assignee: Entit Software LLC, Sunnyvale, CA (US)

( * ) Notice: Subject to any disclaimer, the term of this patent is extended or adjusted under 35 U.S.C. 154(b) by 134 days.

(21) Appl. No.: 15/169,645

(22) Filed: May 31, 2016

(65) Prior Publication Data

US 2017/0005856 A1 Jan. 5, 2017

Related U.S. Application Data (60) Provisional application No. 62/188,461, filed on Jul. 2, 2015.

(51) Int. Cl.
*H04L 12/24* (2006.01)
*H04L 29/08* (2006.01)

(52) U.S. Cl.
CPC .............. *H04L 67/32* (2013.01); *H04L 67/22* (2013.01)

(58) Field of Classification Search
CPC ................................ H04L 67/32; H04L 67/22
See application file for complete search history.

(56) References Cited

U.S. PATENT DOCUMENTS

| 7,246,076 | B2 | 7/2007 | Vajracharya et al. | |
|---|---|---|---|---|
| 7,440,973 | B2 | 10/2008 | Tsukerman et al. | |
| 7,457,762 | B2 | 11/2008 | Wetzer et al. | |
| 8,423,731 | B1 | 4/2013 | Nadathur et al. | |
| 2008/0134177 | A1* | 6/2008 | Fitzgerald | G06F 21/51 718/1 |
| 2008/0256593 | A1* | 10/2008 | Vinberg | G06Q 10/06 726/1 |
| 2008/0281660 | A1* | 11/2008 | Sajja | G06Q 10/06 705/7.26 |
| 2010/0318391 | A1* | 12/2010 | Gvirtsman | G06Q 10/06 705/7.39 |
| 2011/0113001 | A1* | 5/2011 | Byrne | G06F 17/30371 706/50 |
| 2011/0225275 | A1* | 9/2011 | Shah | G06F 9/44505 709/223 |
| 2013/0085799 | A1 | 4/2013 | Zhang et al. | |

OTHER PUBLICATIONS

Smith, T., "Webcast: 5 Ways Monitoring SQL Server Agent Jobs Can Make Your Job Easier," (Research Paper), Apr. 15, 2015, 1 page.

* cited by examiner

*Primary Examiner* — Scott B Christensen (57) ABSTRACT

A change in an information technology system may be monitored. The information technology system may include a computing resource, a computing service that is to utilize the computing resource, a resource policy including a rule that is to be matched to the computing resource. A compliance operation may be performed on the computing resource in accordance with the rule. A schedule may be changed for a maintenance window in which the compliance operation is to be performed. The change of the schedule may be based on the monitored change in the information technology system and on a priority of the compliance operation or of the computing service.

20 Claims, 5 Drawing Sheets

MAINTENANCE WINDOW SCHEDULING

RELATED APPLICATIONS

This application claims priority to U.S. Provisional Application No. 62/188,461 filed on Jul. 2, 2015, entitled "INTELLIGENT SCHEDULER FOR RESOURCE POLICY IMPLEMENTATION", the entire contents of which are hereby incorporated herein by reference.

BACKGROUND

Computing services are increasingly utilizing large networks of computing resources for data storage and manipulation. Such computing services may rely on multiple layers of computing resource infrastructure, and each layer can include numerous types of computing resources, including but not limited to network, hardware, storage devices, servers, middleware, and software applications.

BRIEF DESCRIPTION

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

In some examples, computer services may utilize and process large amounts of data which may be obtained from computer applications, databases, websites, etc. These computing services may utilize data centers, server farms, cloud computing resources, and other computer systems. Computer applications may outsource data storage and/or processing to a computing service for a variety of reasons. For example, a computing service may comprise a cloud-storage service utilizing a data center to store data outsourced by a plurality of computer applications. Data stored may then be accessed any time a local computer running the computer application is connected to the Internet, or otherwise networked with the data center, and the data would not take up undue space on the local computer's data storage. The data could also be made accessible to other computing devices running separate instances of the computer application.

Large computing services, such as those that maintain popular computer applications or websites, may store and manipulate large amounts of data. Therefore, they may utilize thousands or even millions of individual computing resources. Such resources may include storage devices, network devices, servers, computer terminals, middleware, drivers, and software applications, among others. These computing resources may be organized into individual layers, wherein each layer contains computing resources with similar properties. As described in more detail below, these layers may be arranged hierarchically, with software layers which may depend on middleware layers, which in turn may depend on storage, compute, and network layers.

Examples of computing services may include on-line shopping services that include functionality for processing credit cards or other electronic forms of payment. For example, a collection of computing resources within a computing service may collectively generate a website or other remotely accessible computer application. Such a website or computer application may be programmed to accept credit cards or other electronic forms of payment. Because the computing service may store the user's payment information, the service may be required to comply with a regulatory policy that regulates the storage of electronic payment information, such as the Payment Card Industry Data Security Standard (PCI DSS). A resource policy may be designed to ensure that the computing service is compliant with such a policy.

In some examples, a computing service may also store information about a user's personal preferences or computer usage habits. For example, a user could access a website via an Internet browser. A computing service could collect information about how the user interacts with the website. Such information may be used by the computing service to enhance the website or other computer application, or to direct targeted advertisements to the user. The computing services described above are merely examples, and numerous other types of computing services may utilize the processes and configurations described herein.

Because computing services can store and manipulate sensitive and personal user information, these computing services may be subject to other forms of regulatory control. For example, services that store patient health information may be subject to regulation under the Health Insurance Portability and Accountability Act (HIPAA). Other computing services storing or using other types of data may be subject to other regulations not explicitly described in the present disclosure. Furthermore and in other examples, a policy used to manage a computing service may not be based on an externally imposed regulatory policy. For example, a resource policy may be based on internal preferences regarding resource behavior. For example, a resource policy could be directed toward internal data security within a computing service, with corresponding rules mandating that data storage modules maintain certain encryption standards, passwords have a threshold level of strength, etc.

Regulatory policies may include a number of requirements and rules which apply to specific types of computing resources. In one example requirement, a regulatory policy could mandate that any storage device that holds confidential patient health information conform to certain data encryption standards. In another example requirement, a software application that accesses the confidential patient health information should lock a user out after a certain number of incorrect password entries. Rules, which are dependent upon the requirements, apply to specific types of resources. For example, one rule might mandate that a certain type of storage device uses a specific encryption method, while another rule might mandate that a different type of storage device uses a different encryption method. In another example, both storage devices might use the same encryption method, but with separate rules that execute device-specific mechanisms to achieve the encryption. In another example, a requirement could mandate that server passwords meet a minimum strength threshold. Individual rules dependent upon this requirement could be applied to servers running different operating systems. For example, one rule may check password strength in Windows servers, while another rule may check password strength on Linux-based servers.

In some examples, management of computing resources may involve the implementation of service-wide management policies including diverse requirements across thousands of individual computing resources, and may involve maintaining and verifying compliance. In some examples, implementing such policies within computing services containing many types of computing resources may be difficult and time consuming for owners and managers of computing services. A computing service owner may not be particularly knowledgeable regarding the specific regulatory policies which may apply to the computing service. The computing service owner additionally may not have the time or the required technical expertise to apply the regulatory policy to the computing service.

Furthermore, in some examples it may not be possible to make changes to individual computing resources while a computing service is active. Therefore, resource configuration may take place when some aspects of the computing service are offline. As an example, if a computing service generates a website, and some of the resources within the computing service are found to be in violation of rules, it may not be possible or may be difficult to remediate the rule violations without taking the website offline for maintenance. Therefore, schedule maintenance periods may be manually scheduled during time windows in which the website is not frequently accessed. However, scheduling these maintenance periods can be difficult and time-consuming for a service owner, especially since it may not be known how many resources are in need of remediation, how long such remediation may take, and/or due to the manual nature of the scheduling.

In some examples, solutions attempting to help computing service owners manage compliance with regulatory policies as applied to computing service resources may apply to specific types of resources (e.g. network devices, server computers, etc.) and not to other resources. In some examples, solutions may check for compliance with a specific regulatory policy (e.g. PCI) but not with other policies. Furthermore, many solutions may involve frequent and significant management and oversight from the computing service owner to ensure that compliance is being maintained. Still further, some solutions may use a single, self-contained central application to manage the thousands of computing resources making up the computing service. This could significantly burden the central application, leading to errors and poor performance.

In some cases, some software solutions additionally attempt to schedule maintenance periods for resources within a computing service. In many cases, however, these solutions may involve substantial management and oversight from the computing service owner. Some solutions may involve manual scheduling, while others may rely upon a generic job scheduler. As such, these solutions may operate with limited complexity across relatively few dimensions of a computing service.

In some examples and as described in more detail below, a software or human policy architect may generate a resource policy including a plurality of requirements and dependent rules for a computing service owner, wherein the requirements and rules are designed to ensure the computing service complies with a given resource policy. Functional area experts may apply the requirements and rules written by the policy architect to individual computing resources and groups of computing resources. Once written, the policy may be instantiated within the computing service. A central application, or compliance system, may programmatically match the hierarchy of resources within the computing service to the policy requirements and rules, and may remediate any deviations from the resource policy. In some examples, the compliance system may delegate elements of compliance evaluation to individual resources within the computing service. Such resources can therefore self-evaluate, reducing the burden placed upon the central application. Although the above contemplates a particular separation of configuration responsibility (policy architect, functional experts, etc.), in some examples the roles can be spread across more or fewer categories of participating entities.

In some examples, the present disclosure further relates to intelligently scheduling compliance operations to detect and remediate rule violations. In some examples, such compliance operations can take place during periods of computing service downtime but not at other times. Additionally, it may be difficult to predict how much time a given rule violation will require to remediate, depending on how many resources are in violation and how many changes are required. In some examples, further complexity can be introduced when a single resource is shared by a plurality of different computing services, and is managed by a corresponding plurality of resource policies.

In some examples, compliance operations can be intelligently scheduled to take place during pre-determined maintenance windows. Such maintenance windows can be scheduled so as to comply with service level objectives for individual resources, where service level objectives include time limits within which compliance operations must be completed. In some examples, priority levels may be assigned to computing services and resource policies. Maintenance windows may then be intelligently scheduled to prioritize compliance operations for services or policies with higher priority levels.

Accordingly, the present disclosure may provide for enhanced functioning of computing systems, e.g. information technology systems.

Figure 1:
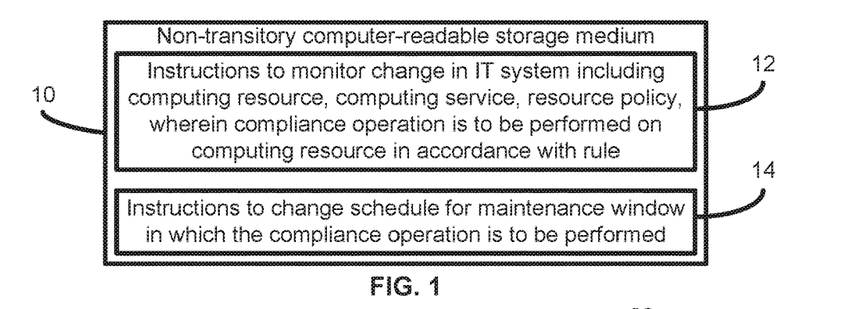
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to monitor a change in an information technology system, the information technology system including a computing resource, a computing service that is to utilize the computing resource, a resource policy including a rule that is to be matched to the computing resource, wherein a compliance operation is to be performed on the computing resource in accordance with the rule. The non-transitory computer readable storage medium 10 may include instructions 14 executable by a processor to change a schedule for a maintenance window in which the compliance operation is to be performed, wherein the change of the schedule is based on the monitored change in the information technology system and on a priority of the compliance operation or of the computing service.

Figure 2:
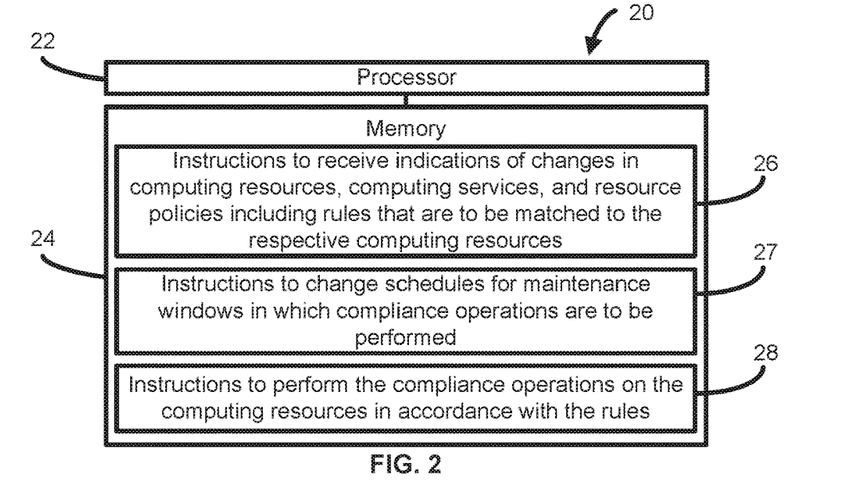
FIG. 2 is block diagrams illustrating a system according to some examples.

FIG. 2 is a block diagram illustrating a system 20 according to some examples. The system 20 may include a processor 22 and a memory 24. The memory 24 may include instructions 26 executable by the processor to receive indications of changes in computing resources of an information technology system, computing services that are to utilize the computing resources, and resource policies including rules that are to be matched to the respective computing resources. The memory 24 may include instructions 27 executable by the processor to receive indications of changes in computing resources of an information technology system, computing services that are to utilize the computing resources, and resource policies including rules that are to be matched to the respective computing resources. The memory 24 may include instructions 28 executable by the processor to perform the scan and remediation compliance operations on the computing resources in accordance with the rules.

Figure 3:
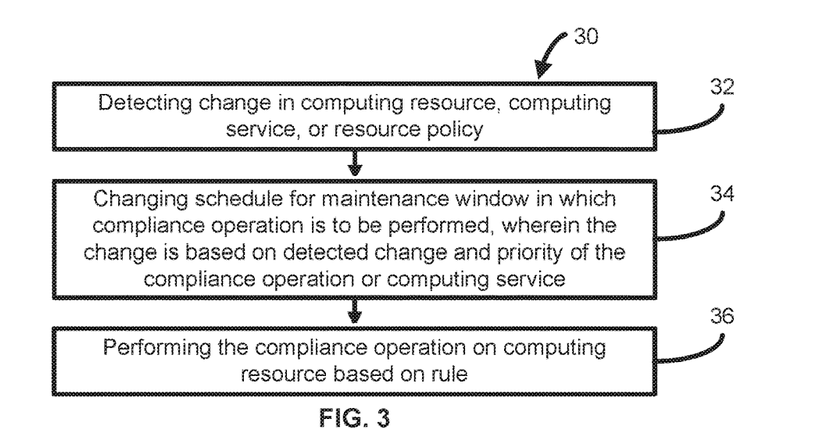
FIGS. 3 and 9 are flow diagrams illustrating methods according to some examples.

FIG. 3 is a flow diagram illustrating a method 30 according to some examples. The following may be performed by a processor. At 32, a change may be detected in a computing resource of an information technology system, a computing service that is to utilize the computing resource, or a resource policy including a rule that is to be matched to the computing resource. At 34, a schedule may be changed for a maintenance window in which a scan compliance operation or a remediation compliance operation is to be performed, wherein the change of the schedule is based on the detected change and on a priority of the compliance operation or of the computing service. At 36, the scan compliance operation or the remediation compliance operation may be performed on the computing resource based on the rule.

Figure 4:
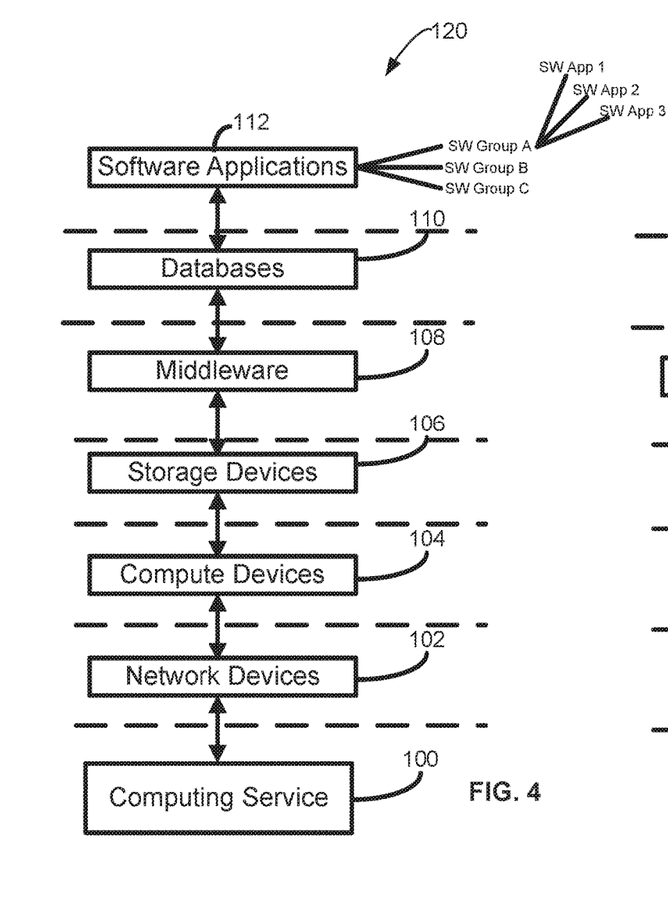
FIGS. 4, 5, and 8 are representations of computing services according to some examples.
Figure 5:
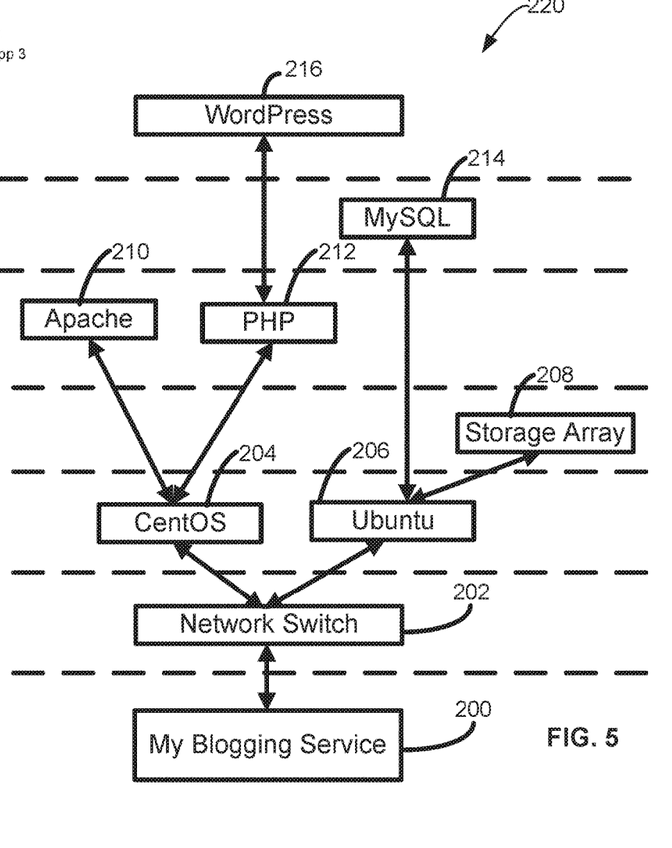

FIG. 4 depicts an example computing service 100 according to some examples. Computing service 100 may utilize a plurality of individual computing resources that are distributed among a plurality of layers comprising a hardware/software stack 120. In this example and moving from bottom to top in FIG. 4, the layers may include a network layer comprising network devices 102, a compute layer comprising computing devices 104, a storage layer comprising storage devices 106, a middleware layer comprising middleware 108, a databases layer comprising databases 110, and an applications layer comprising software applications 112. Resources with similar properties are grouped into the same layer. With reference also to FIG. 5 and as described in more detail below, resources within the same layer may also be of different types, such as a Community Enterprise Operating System (CentOS) server and an Ubuntu server in a Compute layer. Layers of resources may depend upon one another. For example the software applications layer is dependent upon the databases layer, the databases layer is dependent upon the middleware layer, and so on. The layers shown in FIG. 4 are not intended to be limiting. In some examples computing service 100 could utilize additional or fewer layers as needed.

Each resource layer is in turn hierarchically defined. For example, the software applications layer is shown as being comprised of three groups, software groups A, B, and C. Furthermore, software group A is shown as being comprised of software applications 1, 2, and 3. The software applications layer is therefore organized as a hierarchy, with software applications 112 being divided up into multiple groups, and each group being divided up into multiple specific software applications 112. In a similar manner, the resources in each of the other layers may be organized in a similar hierarchy. For example, the databases layer may be organized as a hierarchy and divided up into groups, sub-groups, sub-sub-groups, etc. Layers and groups comprising the computing service 100 may be divided up as many times and in as many ways to achieve a granularity which is ideal for resource management.

In some examples, each individual resource utilized by computing service 100 may be assigned a type, defined by the hierarchical structure into which the resource fits. For example, any resources within the compute devices layer will have compute devices as a type property. As shown in the example of FIG. 5 and noted above, resource type properties may additionally be defined by the groups and subgroups they are a part of within a layer, such as servers operating on different OS platforms. Using the example of FIG. 4, any resources within software group A will have software group A as a type property. Individual resources can have as many type properties as needed to conform to the resource hierarchy. Therefore, the overall type of software app 1 may be defined by its individual type properties, which in this example include: software app 1, software group A, and software applications.

FIG. 5 depicts another example of a computing service 200 in the form of a blogging service 200 denoted My Blogging Service. As illustrated, My Blogging Service 200 comprises a series of resource layers that comprise a hardware/software stack 220. The computing service 200 is composed of a plurality of resources spread across multiple layers, and there may be multiple types of resources within a single layer. Reading from bottom to top, My Blogging Service 200 includes a network device layer comprising a network switch 202, a computing device layer comprising a CentOS server 204 and an Ubuntu server 206, a storage devices layer comprising a storage array 208, a middleware layer comprising Apache and PHP middleware applications 210 and 214, a database layer comprising a MySQL database 214, and a software applications layer comprising a WordPress application 216.

Various relationships and dependencies may exist between the resources distributed throughout the layers. For example, the MySQL database 214 and the storage array 208 communicate with the Ubuntu server 206, while the network switch 202 communicates with both servers 204 and 206. In the example of FIG. 5, the network switch 202 is dependent upon the CentOS and Ubuntu servers 204 and 206, while the Ubuntu server 204 is dependent upon the storage array 208.

Figure 6:
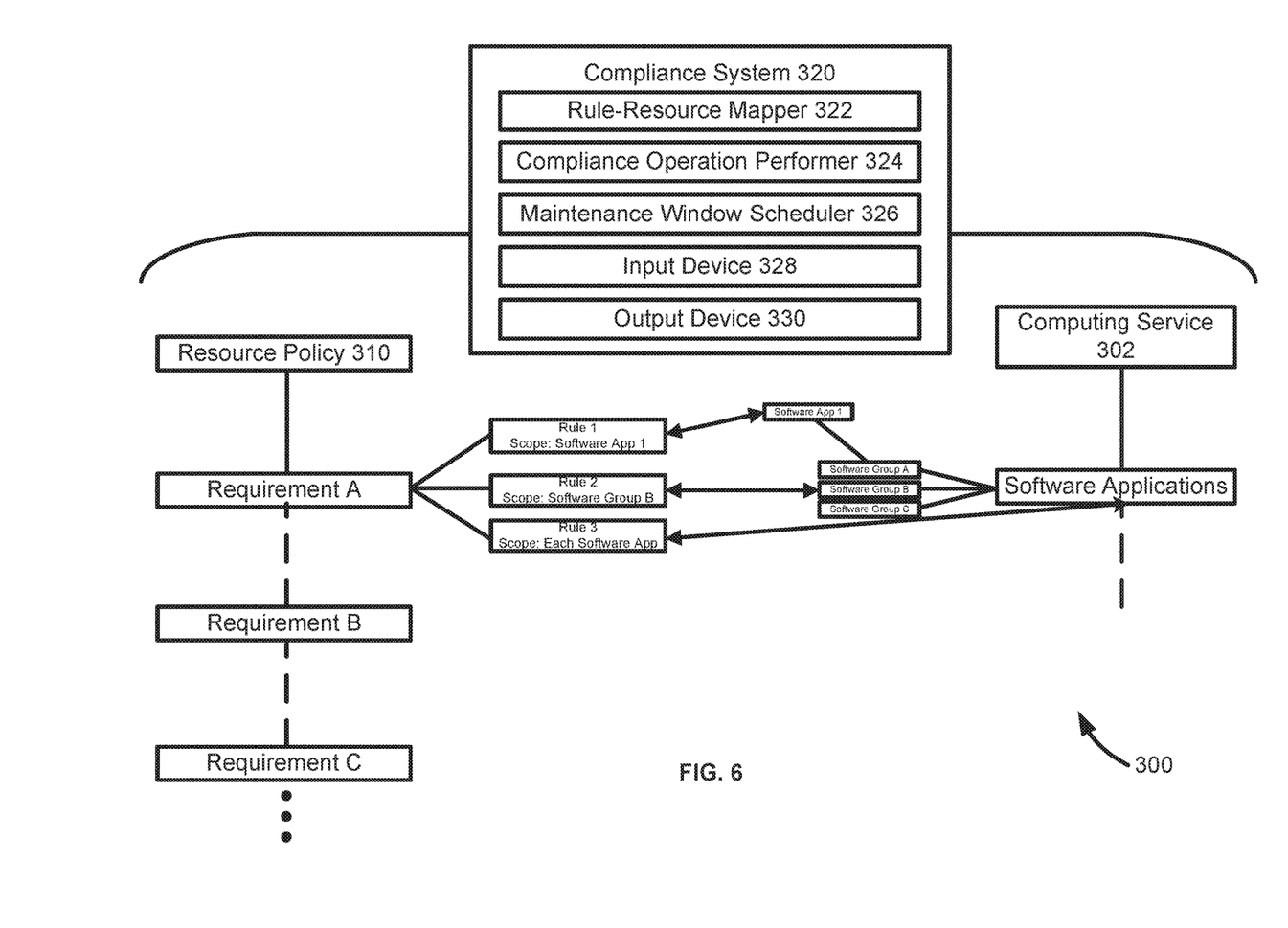
FIG. 6 is a diagram showing an information technology (IT) system including a compliance system, resource policy and related requirements and rules, and one of the requirements and associated rules from a resource policy being matched to resources and groups of resources in a computing service hierarchy according to some examples.

FIG. 6 is a diagram showing an information technology (IT) system 300 include a compliance system 320, a resource policy 310 and related requirements and rules, and one of the requirements and associated rules from a resource policy being matched to resources and groups of resources in a computing service hierarchy according to some examples. Resource policy 310 defines a plurality of requirements which are applied to the plurality of resources within a computing service, such as computing service 302, which may, in some examples, be similar to computing service 100. Each requirement may be comprised of a plurality of dependent rules. For example, resource policy 310 comprises Requirements A, B, and C, while Requirement A comprises Rules 1, 2, and 3. While the example of FIG. 6 shows Requirement A as comprising multiple dependent rules, each of the requirements in resource policy 310 may be similarly partitioned. For example, Requirement B may be divided up into a plurality of dependent rules. Resource policy 310 can define as many requirements and rules as needed to ensure compliance of applicable computing service.

Resource types may serve as a unit to which policy rules are applied. Each rule within resource policy 310 may be assigned a scope, where the scope is defined by the resource type property to which the rule applies. For example, rules within resource policy 310 may be applied to resources within computing service 302 when the rule scope matches the resource type. For example, Rule 1 may have a scope applying it to any resources with a type including "Software App 1." Meanwhile, Rule 2 may have a scope applying it to any resources with a type including "Software Group A." As such, Rule 1 may be applied to a single resource (Software App 1), while Rule 2 may be applied to each of the resources within Software Group A (SW Apps 1, 2 and 3).

Another rule may have a scope applying it to each of the resources within the computing devices layer, or to resources within the computing devices layer that are running a specific operating system or class of operating systems. As such, the granularity of the rules within resource policy 310 may be set to match the hierarchy within computing service 302, such that any resource or group of resources can be managed to achieve policy compliance.

In some examples, responsibilities for creating and implementing a resource policy may be divided between multiple individuals. As such, individual tasks may be delegated to individuals with the proper expertise. In an example, a computing service owner owns the computing service and the resources within it. The owner is therefore an expert at running the computing service, and is responsible for replacing and maintaining individual resources, as well as configuring the resources to work together to store and manipulate data as needed. For example, the computing service may store patient health information received from a computer application used by healthcare professionals.

However, the computing service owner may not have detailed knowledge of the regulatory policies that may apply to the computing service. Additionally, the service owner may not have the time or technical expertise required to modify the computing service to achieve and maintain compliance with any relevant regulatory policies. As such, in some examples, the computing service owner may be responsible for requesting that the computing service comply with a certain resource management policy, and for providing configuration details of the computing service.

In some examples, a policy architect also may be utilized. The policy architect may have a detailed knowledge of the regulatory policy with which the computing service needs to comply. In the case of a computing service which stores patient health information, the computing service may be required to comply with HIPAA regulations. In this example, the policy architect may analyze these regulations and generate a resource policy comprising requirements and dependent rules. Each rule has a scope which applies the rule to resources based on resource type. As an example, a requirement could mandate that all data storage modules utilize data encryption. A rule could require that a specific type of data storage module utilize a specific type of encryption, while another rule could require that a different specific type of data storage module utilize a different type of encryption. Still further, a requirement could mandate that all resources within a Computing device layer protect access to sensitive information through a password login system, where the passwords have to meet a certain minimum strength. In this example, individual rules could be used to check password strength for different computing devices utilizing different operating system platforms.

In some examples, functional area experts may use the resource policy to implement each rule of the policy, and thereby ensure that the resource or group of resources to which the rule applies achieves compliance with the policy. For example, the policy architect may write a rule that requires each of the resources within a Computing device layer to maintain a minimum password strength. To implement this rule on the corresponding computing resources, the compliance system may use a control that alters settings or lines of code to cause each relevant computing resource to return an error message if a user attempts to set a new password which does not comply with the minimum password strength rule. The specific settings and lines of computer code to be modified may depend upon the resource's operating system, or other properties of the affected resource which relate to the steps required to implement the minimum password strength requirement.

A division of responsibilities between a number of individuals, as described above, may allow tasks to be delegated to individuals with the relevant expertise. In some examples, a service owner with no knowledge of a given regulatory policy may request that the service complies with the policy, but may not have to take part in defining the resource policy requirements or rules. Each individual may therefore work on separate tasks simultaneously, and largely independently from each other, which in some examples can result in efficiency in the resource policy generation and implementation process.

The responsibilities described above may be further divided up. For example, multiple individuals may cooperatively own a computing service, and each individual may be involved in the policy generation and implementation process to a greater or lesser degree. Additionally, the responsibilities of the policy architect may be shared by multiple individuals working collaboratively. Finally, any number of functional area experts can be used to implement the resource policy rules on specific resources. For smaller computing services, a single functional area expert with a broad knowledge of all of the resources within the computing service may suffice. Larger computing services which contain thousands or millions of resources with a variety of types may require a plurality of functional area experts, with multiple functional area experts responsible for a single type of resource. While the above contemplates a particular separation of configuration responsibility (policy architect, functional experts), the roles can be spread across more or fewer categories of participating entities.

Once a resource policy has been implemented, the compliance system 320 may: using a rule-resource mapper 322, programmatically match rules to resources based on rule scope and/or resource type; using a compliance operation performer 324, verify policy compliance of each resource with its corresponding rule(s); and using a maintenance window scheduler 326, dynamically change (e.g. create and/or modify) maintenance window schedules.

In some examples, the rule-resource mapper 322, compliance operation performer 324, and maintenance window scheduler 326 of the compliance system 320 may each be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, rule-resource mapper 322, compliance operation performer 324, and maintenance window scheduler 326 may each include hardware features to perform processes described herein, such as a logical circuit, application specific integrated circuit, etc. In some examples, rule-resource mapper 322, compliance operation performer 324, and maintenance window scheduler 326 may be implemented using the same computing system features or hardware.

In some examples, the compliance system 320 may include user input device 328, such as a keyboard, touchpad, buttons, keypad, dials, mouse, track-ball, card reader, or other input devices. Additionally, the compliance system 320 may include output device 330 such as a liquid crystal display (LCD), video monitor, touch screen display, a light-emitting diode (LED), or other output devices. The output devices may be responsive to instructions to display textual information and/or graphical data.

In this example, computing service 302 utilizes a software applications layer, which in turn contains software groups A, B, and C. Software group A includes software app 1. Resource policy 310 includes requirement A, which includes dependent rules 1, 2, and 3. In some examples, resource policy 310 may include additional requirements and dependent rules directed toward additional layers and resources of computing service 302. For example, computing service 302 may contain additional resource layers below the software applications layer, and resource policy 310 may include additional requirements below requirement A.

In some examples, after resource policy 310 has been generated and applied to the computing service 302, the rule-resource mapper 322 may programmatically match resources from computing service 302 to rules from resource policy 310 (e.g. rule-resource pairs). In this manner, the service owner may be freed from the burden of manually mapping rules to resources, which can be difficult and time consuming. In this example, rule 1 has a scope which applies it to each of the resources with a type that includes "software app 1." rule 2 has a scope which applies it to each of the resources with a type that includes "software group B." Rule 3 has a scope which applies it to each of the resources with a type that includes "software applications." Rule-resource-mapper 322 may be used to match each of rule-resource pairs associated with resource policy 310 and computing service 302, including those not shown in FIG. 6.

In some examples, the compliance operation performer 324 may verify policy compliance of each resource with its corresponding rule(s). In some examples, the compliance operation performer 324 may automatically scan for and remediate instances of lack of policy compliance as they are detected. Therefore, in some examples the computing service 302 may not involve constant management or oversight from the service owner, a policy architect, a functional area expert, or other personnel to maintain compliance.

In some examples, checking for policy compliance may comprise two compliance operations: a scan operation and a remediation operation. These operations may be performed through the use of controls. In some examples, a control may take the form of a computer script. During a scan operation, a control may determine whether a given resource is compliant with a given rule. The control may also determine how to remediate the deficiency if a resource is found to be noncompliant.

In some examples, during a scan operation, a control may comprise a computer script that checks to determine a relative password strength. Different scripts, and therefore different controls, may be used to determine password strengths on computing devices running different operating systems. During a remediation operation, a script can be applied to alter settings or lines of computer code to resolve the issues detected by the scan operation. In some examples, each of the controls support scan operations, while a subset of these controls additionally support remediation operations. In examples where a control utilizes a script that can identify noncompliance but not perform remediation, a separate control may then be utilized for remediation. In some examples, multiple simultaneous scan operations may be run against a single resource, as scan operations may not modify any property of the resource. However, in some examples, it may not be possible to run more than one remediation operation on a resource at a time. Furthermore, in some examples, scan operations may be run on a resource while a remediation operation is in progress.

In some examples, controls are defined by a control type and a control scope. A control type may define whether or not the control is to perform (1) a scan operation, or (2) a scan operation and a remediation operation. Control scope may be similar to rule scope, in that it defines to which resource type a control is to be applied. Control scopes can be relatively broad or narrow, Using FIG. 4 as an example, a control scope could be set to apply the control to any resource within the software applications layer, or the scope could be set to apply the control to resources with a type property including "software app 1." Therefore, depending on which resources are in violation of a rule, a control can be chosen which has an appropriate scope. If a number of resources are each violating a relatively broad rule in the same way, a control with a relatively broad scope may be able to remediate each of the resources at once. In other examples, if a single resource or a single type of resource is found to be in violation of a single relatively specific rule, a control with a relatively narrow scope may be used for remediation.

As discussed earlier, in some examples, computing resources may have resource type hierarchies defining a hierarchical arrangement of computing resources depending on resource type. In an example, computing resources may have a hierarchy as shown in Table 1:

TABLE 1

Platform
    Microsoft (MS) Windows
        MS Windows 7
        MS Windows 8
        MS Windows 8.1
        MS Windows Server 2008 R2
        MS Windows Server 2012
        MS Windows Server 2012 R2
    Unix
        Linux
            RHEL Compatibles
                RHEL 5 Compatibles
                    CentOS 5
                    OEL 5
                    RHEL 5
                RHEL 6 Compatibles
                    CentOS 6
                    OEL 7
                    RHEL 8
                RHEL 7 Compatibles
                    CentOS 7
                    OEL 7
                    RHEL 7
            SUSE Compatibles
                OpenSUSE
                    OpenSUSE 12
                    OpenSUSE 13
                SUSE Linux Enterprise Server (SLES)
                    SLES 10
                    SLES 11
            Ubuntu Compatibles
                Debian
                    Debian 7
                Ubuntu
                    Ubuntu 12.04 LTS TABLE 1-continued Ubuntu 14.04 LTS
Oracle Solaris
   Oracle Solaris 11
   Oracle Solaris 11.1

In Table 1, a number of resources within the type hierarchy share the type property "Linux." Within the Linux group, subgroups are shown with type properties "RHEL Compatibles," "SUSE Compatibles," and "Ubuntu Compatibles." These subgroups are further divided into additional subgroups as shown in Table 1.

As an example, a RHEL 5 device may have type properties including RHEL 5, RHEL 5 Compatibles, RHEL Compatibles, Linux, Unix, and additional type properties derived from any groups which may be higher in the hierarchy than the Unix group. Using this example hierarchy, a control's applicable scope could be RHEL 7, RHEL 7 Compatibles, or RHEL Compatibles, among other possibilities. If a control's applicable scope is RHEL 7 Compatibles, then it may be applied to any resources including dependent type properties CentOS 7, OEL 7, or RHEL7. Further, if a control's scope is RHEL Compatibles, then the control may apply to any resources including type properties CentOS 5, 6, or 7, OEL 5, 6, or 7, or RHEL 5, 6, or 7. If a rule has a scope including RHEL 7, an applicable control for evaluating that rule could have a control scope including RHEL 7, RHEL 7 Compatibles, RHEL Compatibles, and so on up the resource hierarchy. Accordingly, this resource type hierarchy may allow a compliance system to quickly and efficiently match a violated rule to a control with an applicable scope.

In some examples, a control may be subject to revision over the course of its lifecycle. Each revision goes through a draft state to submitted state, then to a production state, and finally to an obsolete state. In some examples, one revision of a control may be in a production state at one time. During rule compliance evaluation, controls in production state (but not other controls) may be considered for use. If a resource is found to be in violation of a rule, controls which support both scan and remediation operations (but not other controls) may be considered for use.

In some examples, it may not be possible to perform compliance operations, including scan and remediation operations, without taking part of or an entire computing service offline. As such, a service level objective may be assigned to each individual resource, with the service level objective defining a time limit during which compliance operations applied to that resource take place. Service-level objectives also may be assigned to groups of resources or entire computing services. This may be done to minimize the length of time a computing resource is unavailable, and therefore minimize the length of time the computing service is kept offline.

As described above, such compliance operations may be scheduled to take place within predetermined maintenance windows, which may occur during periods of time during which the computing service is relatively inactive. In some examples, such maintenance windows may include a start time, a duration, and an occurrence pattern. For example, a maintenance window may be scheduled to begin at 2:00 AM on Saturday, and reoccur at this time every other week. In some examples, maintenance windows may additionally include start and end dates. In some examples, the time at which a maintenance window is scheduled to begin may be recorded as a UTC time. In other examples, a specific time-zone may be selected based on either user input or a default system setting.

In some examples, maintenance windows may be associated with a type, where the possible types include read-only, read/write, and system. During a read-only maintenance window, scan operations may be performed, but remediation operations may not be performed. During a read/write window, both scan operations and remediation operations may be performed. During a system maintenance window, system-wide tasks may be performed, which may include promoting policies based on the effective policy date, evaluating expiring exceptions, or recalculating compliance results. In some examples, a maintenance window may be the same for each of the resources within a collection of resources, or individual maintenance windows may be tailored to individual services, groups, subgroups, or resources.

Figure 7:
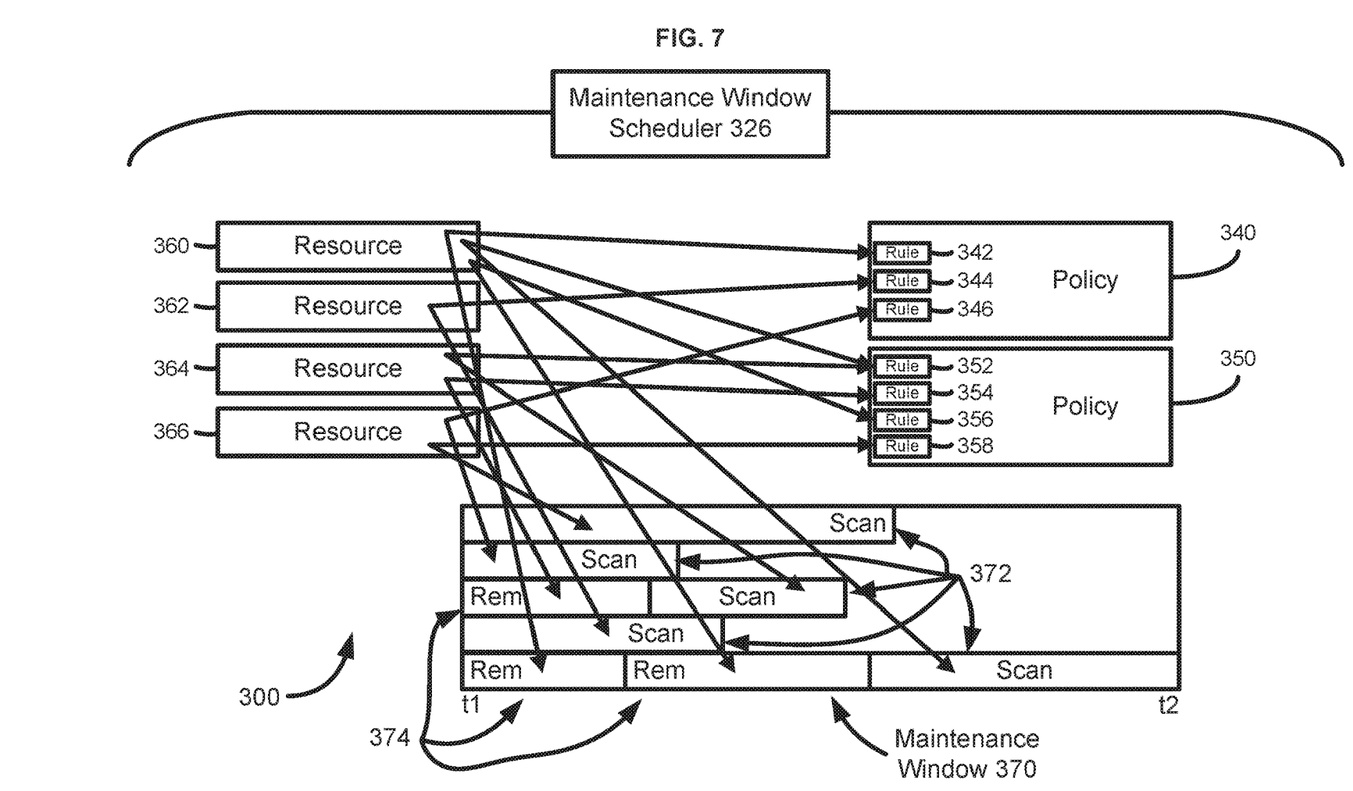
FIG. 7 is a diagram showing an information technology (IT) system including a maintenance window scheduler, a plurality of computing resources and an available maintenance window of access, policies and rules that apply to each computing resource, and mapping of a rule-resource combination to a particular maintenance window according to some examples.

FIG. 7 shows a diagram of additional aspects of the information technology (IT) system 300, including the maintenance window scheduler 326, an available maintenance window 370 of access to each of a plurality of computing resources 360, 362, 364, and 366, the particular policies 340 and 350 and their respective rules 342, 344, 346, 352, 354, 356, and 358 that apply to each of the computing resources 360, 362, 364, and 366, and the mapping of a rule-resource combination to a particular maintenance window 370. As shown, scan operations 372 and remediation operations 374 may be scheduled within the maintenance window 370, which may extend from time t1 to time t2. As illustrated, in this example the maintenance window scheduler 326 may be utilized to dynamically change (e.g. create and/or modify) maintenance window schedules, and may optimize access to various resources based on which resources are shared across which policies.

The maintenance window scheduler 326 may monitor the IT system for changes, including changes to ongoing or scheduled compliance operations (e.g. scan and remediation operations), computing services, resource policies, rules, computing resources, and service level objectives. Responsive to the results of the monitoring (e.g. in response to changes in the IT system), the maintenance window scheduler 326 may dynamically change the maintenance window schedule to increase or decrease maintenance window frequency, change maintenance window type, or alter the schedule of operations to be completed within a maintenance window type. The maintenance window scheduler 326 may make these modifications responsive to time limits imposed on compliance operations, priority levels assigned to computing services or resource policies, changes in resources, services, or policies, records of pending or incomplete operations, specific requirements related to the sharing of individual resources between multiple services, service owner preferences, or a property of a compliance operation such as whether or not a given operation allows multiple simultaneous compliance operations, whether or not a given operation can be broken down into smaller steps, or whether or not a given operation can be paused before completion. Other suitable criteria may be used as well.

In some examples, the maintenance window scheduler 326 may initially schedule more maintenance windows than needed to ensure that each of the compliance operations have time to complete, given that it may be difficult to determine in advance how much time a given compliance operation may need. In some examples, the maintenance window scheduler 326 may collect statistics regarding compliance operation completion during maintenance windows, and dynamically adjust maintenance window scheduling responsive to compliance operation completion statistics. In some examples, such statistics may be modified to account for the number, type, and complexity of compliance operations performed within a given maintenance window. In some examples, heuristics and/or machine learning processes may be utilized to programmatically adjust the scheduling of maintenance windows.

In some examples, additional complexity can be added to the maintenance window scheduling process when multiple computing services share a common collection of computing resources. Each computing service may in turn be managed by its own resource policy. As such, a single computing resource can be a part of multiple computing services and managed by multiple policies. If computing resources are found to be in violation of policy rules, compliance operations may need to be performed to remediate the violation. However, it is possible that the resources in need of remediation may be part of multiple services of varying importance. Therefore, the scheduling may take into account this scenario, for example the maintenance windows may be scheduled based on the highest priority computing service that uses the computing resource, or may otherwise be scheduled in a way to meet service level objectives and compliance policies for the multiple computing services that use the computing resource.

In some examples, a remediation operation may not be scheduled for a relatively minor rule violation when such an operation would involve taking a relatively high priority computing service offline. Therefore, in some examples, the maintenance window scheduler 326 may assign priorities to a plurality of computing services and resource policies. It may then schedule maintenance windows and compliance operations to ensure that operations related to relatively higher priority services or policies are completed before operations related to relatively lower priority services or policies. In some examples, rather than dynamically modify a maintenance window schedule, an maintenance window scheduler 326 may notify a service owner that scheduling changes need to be made.

In some cases a single computing service may include multiple service-oriented architecture units. A service-oriented architecture unit (SoA) is a self-contained unit of functionality with a specific function. For example, an individual SoA could retrieve a specific web page for a user. Each SoA within the computing service may include a plurality of resources within the service to collaborate to achieve the functionality of the SoA. Similar to the examples described above, SoAs may be assigned variable priority levels by the maintenance window scheduler 326, and compliance operations can be scheduled for the SoA with respect to the variable priority levels. SoAs may further have a lifecycle, and undergo numerous revisions throughout the lifecycle. In some examples, SoAs in a production state of their lifecycle may be available to the computing service, but SoAs not in a production state may not be available to the computing service.

In some examples, service level objectives can include measurement service level objectives and remediation service level objectives. Measurement service level objectives can apply to specific resources, groups of resources, or entire computing services. For example, a measurement service level objective period could begin on January 1, and a maintenance window could occur on January 5. During the maintenance window, a compliance operation could take place which evaluates each of the rule-resource pairs and determines that none are in need of remediation. If the time limit specified for the measurement service level objective is "within 30 days," then additional compliance operations may not be performed until at least January 31, when a new measurement service level objective period begins.

In some examples, if a rule-resource pair is found to be noncompliant with resource policies, it may trigger the beginning of a remediation service level objective period. As an example, the remediation service level objective could have a time limit of 2 days. In that case, remediation operations would need to be performed to resolve the rule violation within 2 days of the violation being detected. However in some cases, such remediation may be possible within a scheduled maintenance window but not at other times. As such, the maintenance window scheduler 326 may notify the computing service owner that additional maintenance windows may be needed to meet the time limit imposed by the remediation service level objective. In other examples, the maintenance window scheduler 326 may automatically modify the maintenance windows without input from the computing service owner.

In some cases, a maintenance window may not last long enough to complete each of the scheduled compliance operations. In that case, the system may suspend incomplete operations, and store a record of any incomplete operations and any operations which were scheduled but never started. In some examples, it may be possible for a single compliance operation to require more time than the total duration of a single maintenance window. At the start of the next maintenance window, the system may review the record from the previous maintenance window, and prioritize the completion of any incomplete operations. The system may additionally prioritize the schedule of the operations to be completed within the window such that operations related to relatively high priority services or policies are completed relatively quickly. Furthermore, in some examples, the maintenance window scheduler 326 may modify the maintenance window scheduler 326 to complete any incomplete operations which are approaching their service level objective imposed time-limits, further taking into account relative service and policy priorities.

In some examples, it may be possible for a service owner, or other user with administrator privileges, to view a visualization of (using output device 330) and modify (using input device 228) maintenance window properties and schedules. For example, an administrator may be able to access and view the name, start date, and end date of a maintenance window. The administrator may further be able to view the details of a specific maintenance window, including but not limited to the type and scheduling information of the window; any SoAs associated with the window, including SoA ID, policy name and ID, computing service name and ID, as well as the name and lifecycle state of the SoA; any compliance operations which previously took place within the window, including operation type, operation ID, operation status, and an ID for the SoA or resource the operation applied to; any currently active operations within the window, including operation IDs, types, statuses, and associated SoAs for the active operations; and the times and schedules for any upcoming maintenance windows within the same maintenance window schedule. Additionally, an administrator may be able to update the details of an existing maintenance window, delete or inactivate an existing maintenance window schedule, or cancel upcoming maintenance windows within the maintenance window schedule.

In some examples, a service owner, user, or administrator to may use the maintenance window scheduler 226 to manually initiate scan or remediation operations on-demand, outside of a maintenance window. However, if a maintenance window happens to be active when the user initiates the on-demand operation, the on-demand operation may be added to a queue along with other operations scheduled to take place within the maintenance window. In other examples, on-demand operations may take precedence over operations previously scheduled to take place during the maintenance window. Furthermore, as an on-demand operation may not be defined by a maintenance window or by any service-level objectives, the operation may continue until completion barring any timeout errors, as there may not be any triggers continued to automatically stop the operation. In some examples, the ability to initiate on-demand operations may be available to users with specific system permissions, but not to other users. For example, if a user without appropriate permissions attempts to begin an on-demand operation, the system may return an error message and refuse to begin the operation.

In some examples, a certain maintenance window schedule can be assigned to a computing service and defined as the default schedule for the service. In such examples, any new SoAs created may automatically adopt the default maintenance window schedule for the service. However, a service owner or administrator may modify the maintenance window schedule for a specific SoA within a computing service. In some examples, a default maintenance window schedule may be copied for a new revision of a SoA or a computing service.

In some examples, the maintenance window scheduler 326 may be applied to computer processes other than compliance operations. The maintenance window scheduler 326 may be used to dynamically schedule virtually any computer process which may include associated time limits, opportunity windows, or priority levels.

As discussed above, a computing service includes a plurality of computing resources, where the number of individual computing resources may be in the thousands or even millions. It can therefore be difficult for a single central application to manage such a large number of computing resources, potentially resulting in errors and otherwise poor performance. In some examples, elements of the compliance system may be distributed to individual resources throughout the computing service. Specifically, rule compliance evaluation may be delegated to the lowest possible relevant computing service resource which has sufficient capabilities. The result of the rule compliance evaluation may then be reported back to the compliance system as a single, binary yes or no response, increasing the performance efficiency of the central application.

In some examples, rules that apply to a single resource may be designated as independent rules. The evaluation of independent rules may be delegated to the individual affected resources. Rules that apply to combinations of resources may be designated as composite rules. Composite rules may not be delegated to individual affected resources, because the affected resources may not have relevant information regarding other resources within the combination of resources. As such, in some examples, rule compliance evaluation for the composite rule may delegated to a separate resource via an "access through resource" process. An access through resource process may utilize any resource which has sufficient information to evaluate whether a rule is being followed. A resource can therefore serve as its own access through resource, or an independent resource can be used to evaluate compliance for a combination of resources.

Figure 8:
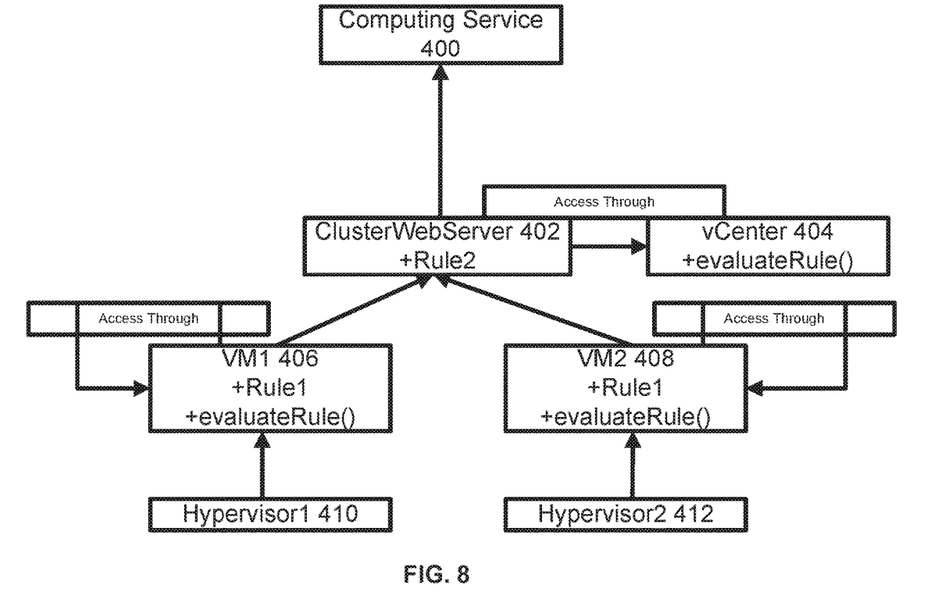

FIG. 8 shows an example of a computing service 400. Computing service 400 may include a plurality of layers, and each layer may include a plurality of groups of resources. As shown, one of these resource groups is ClusterWebServer 402, which is comprised of Virtual Machine 1 (VM1) 406 and Virtual Machine 2 (VM2) 408. Hypervisor 410 is dependent upon VM1 406, while Hypervisor 2 412 is dependent upon VM2 408. Computing service 400 further includes a virtual machine manager 404, such as vCenter. Computing service 400 may be regulated by a resource policy which includes an independent rule (Rule 1) that requires each virtual machine to have a certain minimum amount of available memory. Because this Rule 1 is independent and applies to individual virtual machines, this rule's compliance evaluation can be delegated to the individual virtual machines. As such, VM1 406 and VM2 408 evaluate whether the independent rule is being followed, and report the result of this evaluation to the central application. In this manner, VM1 406 and VM2 408 may serve as their own access through resources.

In some examples, the resource policy regulating computing service 400 may additionally include a composite rule (Rule 2) requiring that no cluster web server can include two virtual machines, where each virtual machine shares the same hypervisor. Because this rule applies to a combination of different resources, a single resource within the combination may not have sufficient information to determine whether the rule is being followed. Due to the nature of the service, ClusterWebServer 402 may not be able to obtain information from VM1 406 and VM2 408 regarding whether the two virtual machines share a common hypervisor. As such, evaluation of Rule 2 is delegated to an independent resource, the virtual machine manager 404. Virtual machine manager 404 can evaluate whether ClusterWebServer 402 is complying with Rule 2, and report the result of this evaluation to the compliance system. In this manner, virtual machine manager 404 is the access through resource for ClusterWebServer 402.

Figure 9:
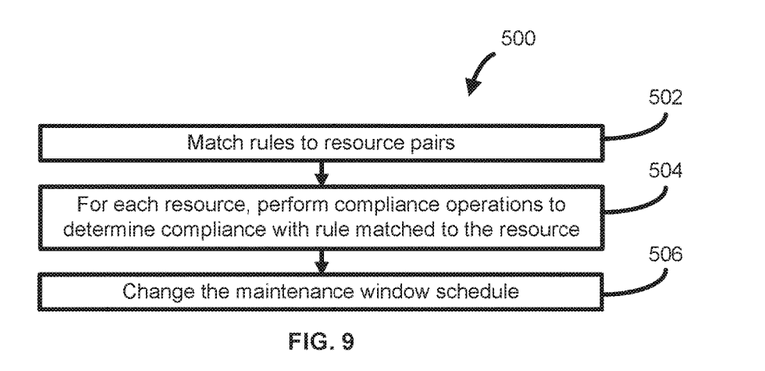

FIG. 9 is a flow diagram illustrating a method 500 according to some examples. In some examples, the orderings shown may be varied, some elements may occur simultaneously, some elements may be added, and some elements may be omitted. In some examples, any of the elements described earlier relative to FIG. 4-8 may be implemented in the process shown in and described relative to FIG. 9.

At 502, the rule-resource mapper 322 may programmatically match rules to resources based on rule scope and/or resource type. Any processes previously described as implemented by the rule-resource mapper 322 may be implemented at 502.

At 504, the compliance operation performer 324 may verify policy compliance of each resource with its corresponding rule(s). Any processes previously described as implemented by the compliance operation performer 324 may be implemented at 506.

At 506, the maintenance window scheduler 326 may dynamically change (e.g. create and/or modify) maintenance window schedules. Any processes previously described as implemented by the maintenance window scheduler 326 may be implemented at 506.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read-only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium comprising instructions executable by a processor to:
monitor for change in an information technology system, the information technology system including a first computing resource, a second computing resource, a first computing service that is to utilize the first computing resource, a second computing service that is to utilize the second computing resource, a first resource policy including a first rule that is to be matched to the first computing resource, and a second resource policy including a second rule that is to be matched to the second computing resource,
wherein a first compliance operation is to be performed on the first computing resource in accordance with the first rule and a second compliance operation is to be performed on the second computing resource in accordance with the second rule;
access a schedule identifying a first maintenance window in which the first compliance operation is to be performed and a second maintenance window in which the second compliance operation is to be performed;
determine a first priority of the first resource policy or of the first computing service and a second priority of the second resource policy or of the second computing service, and
automatically and without user interaction, change the schedule for the first maintenance window, wherein the change of the schedule is based on the monitored change in the information technology system and on the determined first and second priorities,
wherein:
when the first priority is higher than the second priority, the change of the schedule is to cause the first compliance operation to be completed before the second compliance operation, and
when the second priority is higher than the first priority, the change of the schedule is to cause the first compliance operation to be completed after the second compliance operation.

2. The non-transitory computer-readable storage medium of claim 1 wherein
the first compliance operation comprises a scan operation to be performed on the first computing resource to determine whether the first rule is violated,
a remediation operation is to be performed on the first computing resource to remediate the violation, and
the change of the schedule is based on the priority of the first computing service or on another priority of the remediation operation.

3. The non-transitory computer-readable storage medium of claim 1 wherein available settings for the maintenance window include:
read-only, in which a scan operation but not a remediation operation is to be performed,
read/write, in which the scan operation and the remediation operation is to be performed, and
system, in which a system-wide compliance operation is to be performed.

4. The non-transitory computer-readable storage medium of claim 1 wherein the first rule is to be matched to the first computing resource based on a rule scope of the first rule and a resource type of the first computing resource.

5. The non-transitory computer-readable storage medium of claim 1 further comprising instructions executable by the processor to change a second schedule of the first compliance operation to be performed within the first maintenance window based on the monitored change in the information technology system.

6. The non-transitory computer-readable storage medium of claim 1 wherein to change the schedule for the first maintenance window comprises to change a duration of the first maintenance window.

7. The non-transitory computer-readable storage medium of claim 1 wherein to change the schedule for the first maintenance window comprises to change a frequency of the first maintenance window.

8. The non-transitory computer-readable storage medium of claim 1 wherein
to monitor the change in the information technology system comprises to collect statistics regarding completion of past compliance operations in past maintenance windows, and
the change of the schedule is based on the statistics.

9. The non-transitory computer-readable storage medium of claim 1 wherein
the first computing service includes a first service-oriented architecture unit including a first plurality of computing resources including the first computing resource, the first compliance operation being associated with the first service-oriented architecture unit, and
the first computing service includes a second service-oriented architecture unit including a second plurality of computing resources including the second computing resource, the second compliance operation being associated with the second service-oriented architecture unit.

10. The non-transitory computer-readable storage medium of claim 9 further comprising instructions executable by the processor to, in response to creation of a new computing service or a new service-oriented architecture, create a new maintenance window according to a default setting.

11. The non-transitory computer-readable storage medium of claim 1 wherein the change in the information technology system comprises a change in the first computing resource or the first computing service.

12. The non-transitory computer-readable storage medium of claim 1 wherein the change in the information technology system comprises a change in the first resource policy or a service level objective for the first computing service.

13. The non-transitory computer-readable storage medium of claim 1 wherein the change of the schedule is based on a time limit imposed on the first compliance operation.

14. The non-transitory computer-readable storage medium of claim 13 wherein the first compliance operation comprises a remediation operation, and the time limit is imposed based upon the first computing resource being noncompliant with the first rule.

15. The non-transitory computer-readable storage medium of claim 1 wherein the change of the schedule is based on a property of the first compliance operation.

16. The non-transitory computer-readable storage medium of claim 1 wherein the change of the schedule is based on a record of a pending or incomplete compliance operation.

17. The non-transitory computer-readable storage medium of claim 1 further comprising instructions executable by the processor to:
output, to an output device, a visualization representing the schedule and a property of the first maintenance window;
receive, from an input device, a manual modification of the first maintenance window; and
receive, from the input device, a manual initiation of an on-demand compliance operation outside of the first maintenance window.

18. The non-transitory computer-readable storage medium of claim 1 wherein
the information technology system includes another computing resource,
the first computing service is to utilize the other computing resource,
the first rule is a composite rule that is to be matched to the other computing resource, and
the first compliance operation is to be performed in the other computing resource in accordance with the first rule.

19. A system comprising
a processor; and
a memory comprising instructions executable by the processor to:
receive indications of monitored changes in computing resources of an information technology system, computing services that are to utilize the computing resources, and resource policies including rules that are to be matched to the respective computing resources;
change schedules for maintenance windows in which scan and remediation compliance operations are to be performed, wherein the scan and remediation compliance operations comprise a first compliance operation to be performed on a first computing resource of the computing resources in accordance with a first rule of the rules and a second compliance operation of the scan and remediation compliance operations to be performed on a second computing resource of the computing resources in accordance with a second rule of the rules, and changing the schedules comprises:
accessing a schedule of the schedules identifying a first maintenance window in which the first compliance operation is to be performed and a second maintenance window in which the second compliance operation is to be performed;
determining a first priority of a first resource policy of the resource policies or of a first computing service of the computing services and a second priority of a second resource policy of the resource policies or of a second computing service of the computing services; and
automatically and without user interaction, changing the schedule for the first maintenance window based on the monitored changes and on the determined first and second priorities,
wherein:
when the first priority is higher than the second priority, the change of the schedule is to cause the first compliance operation to be completed before the second compliance operation, and
when the second priority is higher than the first priority, the change of the schedule is to cause the first compliance operation to be completed after the second compliance operations.

20. A method comprising:
detecting a change in a first computing resource of an information technology system, a first computing service that is to utilize the first computing resource, or a first resource policy including a first rule that is to be matched to the first computing resource, wherein the information technology system further comprises a second computing resource, a second computing service that is to utilize the second computing resource and a second resource policy including a second rule that is to be matched to the second computing resource;
changing a schedule identifying a first maintenance window in which a first compliance operation is to be performed on the first computing resource according to the first rule and a second maintenance window in which a second compliance window is to be performed on the second computing resource according to the second rule, wherein changing the schedule comprises:
accessing the schedule;
determining a first priority of the first resource policy or of the first computing service and a second priority of a second resource policy or of the second computing service; and
automatically and without user interaction, change the schedule for the first maintenance window, wherein the change of the schedule is based on the detected change in the first computing resource of the information technology system and on the determined first and second priorities,
wherein:
when the first priority is higher than the second priority, the change of the schedule is to cause the first compliance operation to be completed before the second compliance operation, and
when the second priority is higher than the first priority, the change of the schedule is to cause the first compliance operation to be completed after the second compliance operation.

* * * * *